United States Patent
Kanada

(10) Patent No.: US 6,982,934 B2
(45) Date of Patent: Jan. 3, 2006

(54) RECORDING-MEDIUM MANAGEMENT APPARATUS, RECORDING-MEDIUM MANAGEMENT METHOD, PROGRAM HAVING FUNCTION OF MANAGING RECORDING MEDIUM, AND COMPUTER-READABLE PROGRAM STORAGE MEDIUM FOR STORING THE PROGRAM

(75) Inventor: Yoriaki Kanada, Kanagawa (JP)

(73) Assignee: Sony Corporation (JP)

( * ) Notice: Subject to any disclaimer, the term of this patent is extended or adjusted under 35 U.S.C. 154(b) by 415 days.

(21) Appl. No.: 10/322,592

(22) Filed: Dec. 19, 2002

(65) Prior Publication Data

US 2003/0156506 A1 Aug. 21, 2003

(30) Foreign Application Priority Data

Dec. 20, 2001 (JP) .................... P2001-388336

(51) Int. Cl.
*G11B 21/08* (2006.01)

(52) U.S. Cl. ................ 369/30.03; 369/30.07; 369/53.2

(58) Field of Classification Search .............. 369/30.03, 369/47.12, 86, 83, 30.05, 30.07, 33.01, 47.1, 369/47.22, 47.13, 32.01, 53.44, 53.2, 30.17, 369/44.34, 44.29, 44.27
See application file for complete search history.

(56) References Cited

U.S. PATENT DOCUMENTS

| | | | | |
|---|---|---|---|---|
| 5,881,038 A | * | 3/1999 | Oshima et al. | 369/47.12 |
| 6,434,103 B1 | * | 8/2002 | Shitara et al. | 369/83 |
| 2003/0152009 A1 | | 8/2003 | Usui et al. | |

FOREIGN PATENT DOCUMENTS

WO    WO 02/101733 A1    12/2002

* cited by examiner

*Primary Examiner*—Ali Neyzari
(74) *Attorney, Agent, or Firm*—Rader, Fishman & Grauer PLLC; Ronald P. Kananen

(57) ABSTRACT

A recording-medium management apparatus includes a playback unit and a recording-medium management unit. The playback unit includes a reading unit for automatically reading an identifier from a recording medium when data is played back and a transmission unit for transmitting the read identifier to the recording-medium management unit. The recording-medium management unit includes a setting information management unit for managing setting information corresponding to the identifier, a check unit for checking whether or not the setting information corresponding to the identifier received from the playback unit is managed by the setting information management unit, and an obtaining-and-transmitting unit for obtaining the setting information corresponding to the identifier from the setting information management unit and transmitting the setting information to the playback unit.

12 Claims, 10 Drawing Sheets

FIG. 3

| IDENTIFI-CATION NUMBER | TITLE | DATE OF MANU-FACTURE | PURCHAS-ER | CURRENT OWNER | ADDRESS (PHONE NUMBER) | DATE AND TIME OF FIRST ACCESS | TIME FROM RECEPTION TO FIRST ACCESS | E-MAIL NEWS REQUEST FLAG | CATALOG REQUEST FLAG | DATE AND TIME OF UPDATE |
|---|---|---|---|---|---|---|---|---|---|---|
| 12345 | DEMO-DISC 1 | 05/20/01 | DEMO-AGENCY | ICHIRO SATO | MINATO-WARD (03-1111-2222) | 05/25/01 15:40 | 3:10 | YES | NO | |
| 12346 | DEMO-DISC 1 | 05/20/01 | DEMO-AGENCY | JIRO KATO | KITA-WARD | 00/00/00 NO ACCESS | — | — | — | |
| 12347 | DEMO-DISC 1 | 05/20/01 | DEMO-AGENCY | SABURO ITO | SETAGAYA-WARD | 05/27/01 10:40 | 25:20 | NO | YES | |

| IDENTIFI-CATION NUMBER | DELIVERY NUMBER | DESTINA-TION | DATE AND TIME OF SHIPMENT | RECIPIENT | ADDRESS OF RECIPIENT | DATE AND TIME OF RECEPTION | DATE AND TIME OF UPDATE |
|---|---|---|---|---|---|---|---|
| 12345 | 567891 | MINATO-WARD | 05/25/01 11:00 | ICHIRO SATO | MINATO-WARD | 05/25/01 12:30 | |
| 12346 | 567892 | KITA-WARD | 05/25/01 11:00 | JIRO KATO | KITA-WARD | 05/25/01 15:35 | |
| 12347 | 567893 | SETAGAYA-WARD | 05/25/01 11:00 | SABURO ITO | SETAGAYA-WARD | 05/26/01 09:20 | |

RECORDING-MEDIUM MANAGEMENT APPARATUS, RECORDING-MEDIUM MANAGEMENT METHOD, PROGRAM HAVING FUNCTION OF MANAGING RECORDING MEDIUM, AND COMPUTER-READABLE PROGRAM STORAGE MEDIUM FOR STORING THE PROGRAM

BACKGROUND OF THE INVENTION

1. Field of the Invention

The present invention relates to a recording-medium management apparatus, a recording-medium management method, a program having a function of managing a recording medium, and a computer-readable program storage medium for storing the program, in which a predetermined item is requested to be input when data recorded in a recording medium is played back.

2. Description of the Related Art

Owing to a recent development in the information industry, software recorded in recording media, such as optical discs have been distributed. Herein, an optical disc is exemplified as a recording medium. The software is executed by a drive of a computer by a user's operation so that the installer of the software is automatically started and installation is performed.

When the installation of the software is completed, a registration request page for the installed software may be displayed on the display device of the computer. The information to be registered includes, for example, information about the owner of the software. In this case, the user manually inputs his or her name to the computer.

However, the user finds it inconvenient to input the item every time he or she installs software to the computer. In recent years, installing many pieces of software to a computer is common. In this circumstance, the inconvenience for the user increases in accordance with the number of pieces of software to be installed, and it is difficult to manage recording media.

SUMMARY OF THE INVENTION

Accordingly, an object of the present invention is to solve the above-described problems and to provide a recording-medium management apparatus, a recording-medium management method, a program having a function of managing a recording medium, and a computer-readable program storage medium for storing the program, in which a recording medium can be easily managed based on an identifier which is read when data recorded in a recording medium is played back.

In order to achieve the above-described object, according to a first aspect of the present invention, a recording-medium management apparatus comprises a playback unit for playing back data recorded in a removable recording medium to which a unique identifier is attached and a recording-medium management unit for managing the recording medium based on the identifier. The playback unit includes: a reading unit for automatically reading the identifier from the recording medium when the data is played back; and a transmission unit for transmitting the read identifier to the recording-medium management unit. The recording-medium management unit includes: a setting information management unit for managing setting information corresponding to the identifier; a check unit for checking whether or not the setting information corresponding to the identifier received from the playback unit is managed by the setting information management unit; and an obtaining-and-transmitting unit for obtaining the setting information corresponding to the identifier from the setting information management unit and transmitting the setting information to the playback unit.

In this configuration, the setting information management unit of the recording-medium management unit manages items which are set corresponding to the unique identifier attached to the recording medium. When the playback unit plays back data recorded in the recording medium, the identifier is first read from the recording medium. The identifier is transmitted to the recording-medium management unit, and it is determined whether or not setting information corresponding to the identifier exists. Also, the setting information corresponding to the identifier of a computer is obtained and is transmitted to the playback unit.

The setting information is registered in the setting information management unit based on the identifier when the recording medium is delivered.

With this configuration, the setting information of the recording medium can be reliably registered in the setting information management unit when the recording medium is delivered to a purchaser.

When the reading unit cannot read the identifier of the recording medium, the identifier can be input to the playback unit.

Accordingly, the identifier of the recording medium can be reliably transmitted to the recording-medium management unit.

The apparatus may further comprise a delivery management unit for managing at least the date and time of reception, which is the date and time when the delivered recording medium is received by a recipient. The setting information includes the date and time of first access, which is the date and time when the playback unit accesses the recording-medium management unit for the first time, and the elapsed time from the date and time of reception to the date and time of first access.

With this arrangement, the user's interest can be presumed based on the elapsed time from the date and time of reception to the date and time of first access. Therefore, marketing can be conducted so as to search the user's interest based on the elapsed time.

In the playback unit, a predetermined item which is a part of the setting information is requested to be input and the input item is transmitted to the recording-medium management unit together with the identifier when the data recorded in the recording medium is played back. The recording-medium management unit determines whether or not the input item matches the predetermined item.

With this arrangement, when the playback unit plays back data recorded in the recording medium and when input of the predetermined item is requested, the playback unit can obtain the setting information corresponding to the identifier attached to the recording medium, and thus the setting information need not be input. Therefore, the user operating the playback unit is saved from having to input the setting information.

According to a second aspect of the present invention, a recording-medium management method is performed by a playback unit for playing back data recorded in a removable recording medium to which a unique identifier is attached and a recording-medium management unit for managing the recording medium based on the identifier. The method comprises: in the playback unit, a reading step for automatically reading the identifier from the recording medium when the data is played back; and a transmission step for transmitting the read identifier to the recording-medium management unit, and in the recording-medium management unit, a setting information management step for managing setting information corresponding to the identifier; a check step for checking whether or not the setting information corresponding to the identifier received from the playback unit is managed; and an obtaining-and-transmitting step for obtaining the setting information corresponding to the identifier from a setting information management unit and transmitting the setting information to the playback unit.

In this configuration, the setting information management unit of the recording-medium management unit manages items which are set corresponding to the unique identifier attached to the recording medium. When the playback unit plays back data recorded in the recording medium, the identifier is first read from the recording medium. The identifier is transmitted to the recording-medium management unit, and it is determined whether or not setting information corresponding to the identifier exists. Also, the setting information corresponding to the identifier of a computer is obtained and is transmitted to the playback unit.

The setting information is registered in the setting information management unit based on the identifier when the recording medium is delivered.

With this arrangement, the setting information of the recording medium can be reliably registered in the setting information management unit when the recording medium is delivered to a purchaser.

When the identifier of the recording medium cannot be read in the reading step, the identifier can be input to the playback unit.

Accordingly, the identifier of the recording medium can be reliably transmitted to the recording-medium management unit.

The method may further comprise a delivery management step for managing at least the date and time of reception, which is the date and time when the delivered recording medium is received by a recipient. The setting information includes the date and time of first access, which is the date and time when the playback unit accesses the recording-medium management unit for the first time, and elapsed time from the date and time of reception to the date and time of first access.

With this arrangement, the user's interest can be presumed based on the elapsed, time from the date and time of reception to the date and time of first access. Therefore, marketing can be conducted so as to search the user's interest based on the elapsed time.

In the playback unit, a predetermined item which is a part of the setting information is requested to be input and the input item is transmitted to the recording-medium management unit together with the identifier when the data recorded in the recording medium is played back. The recording-medium management unit determines whether or not the input item matches the predetermined item.

With this arrangement, when the playback unit plays back data recorded in the recording medium and when input of the predetermined item is requested, the playback unit can obtain the setting information corresponding to the identifier attached to the recording medium, and thus the setting information need not be input. Therefore, the user operating the playback unit is saved from having to input the setting information.

According to a third aspect of the present invention, a recording-medium management program is provided for performing a recording-medium management function by a playback unit for playing back data recorded in a removable recording medium to which a unique identifier is attached and a recording-medium management unit for managing the recording medium based on the identifier. The playback unit includes: a reading unit for automatically reading the identifier from the recording medium when the data is played back; and a transmission unit for transmitting the read identifier to the recording-medium management unit. The recording-medium management unit includes: a setting information management unit for managing setting information corresponding to the identifier; a check unit for checking whether or not the setting information corresponding to the identifier received from the playback unit is managed by the setting information management unit; and an obtaining-and-transmitting unit for obtaining the setting information corresponding to the identifier from the setting information management unit and transmitting the setting information to the playback unit.

In this configuration, the setting information management unit of the recording-medium management unit manages items which are set corresponding to the unique identifier attached to the recording medium. When the playback unit plays back data recorded in the recording medium, the identifier is first read from the recording medium. The identifier is transmitted to the recording-medium management unit, and it is determined whether or not setting information corresponding to the identifier exists. Also, the setting information corresponding to the identifier of a computer is obtained and is transmitted to the playback unit.

According to a fourth aspect of the present invention, a computer-readable program storage medium is provided for storing a recording-medium management program for performing a recording-medium management function by a playback unit for playing back data recorded in a removable recording medium to which a unique identifier is attached and a recording-medium management unit for managing the recording medium based on the identifier. The playback unit includes: a reading unit for automatically reading the identifier from the recording medium when the data is played back; and a transmission unit for transmitting the read identifier to the recording-medium management unit. The recording-medium management unit includes: a setting information management unit for managing setting information corresponding to the identifier; a check unit for checking whether or not the setting information corresponding to the identifier received from the playback unit is managed by the setting information management unit; and an obtaining-and-transmitting unit for obtaining the setting information corresponding to the identifier from the setting information management unit and transmitting the setting information to the playback unit.

In this configuration, the setting information management unit of the recording-medium management unit manages items which are set corresponding to the unique identifier attached to the recording medium. When the playback unit plays back data recorded in the recording medium, the identifier is first read from the recording medium. The identifier is transmitted to the recording-medium management unit, and checks whether or not setting information corresponding to the identifier exists. Also, the setting information corresponding to the identifier of a computer is obtained and is transmitted to the playback unit.

BRIEF DESCRIPTION OF THE DRAWINGS

FIG. 3 is an example of recording-medium information which is managed by a recording-medium information management database shown in FIG. 1;

FIG. 9 is an example of information about delivery of the optical disc which is registered in a delivery management database shown in FIG. 8.

DESCRIPTION OF THE PREFERRED EMBODIMENTS

Hereinafter, preferred embodiments of the present invention will be described with reference to the attached drawings.

Since the following embodiments are preferred specific examples of the present invention, various technically preferable limitations are defined. However, the scope of the present invention is not limited to the embodiments as long as the present invention is not limited in the following description.

First Embodiment

Figure 1:
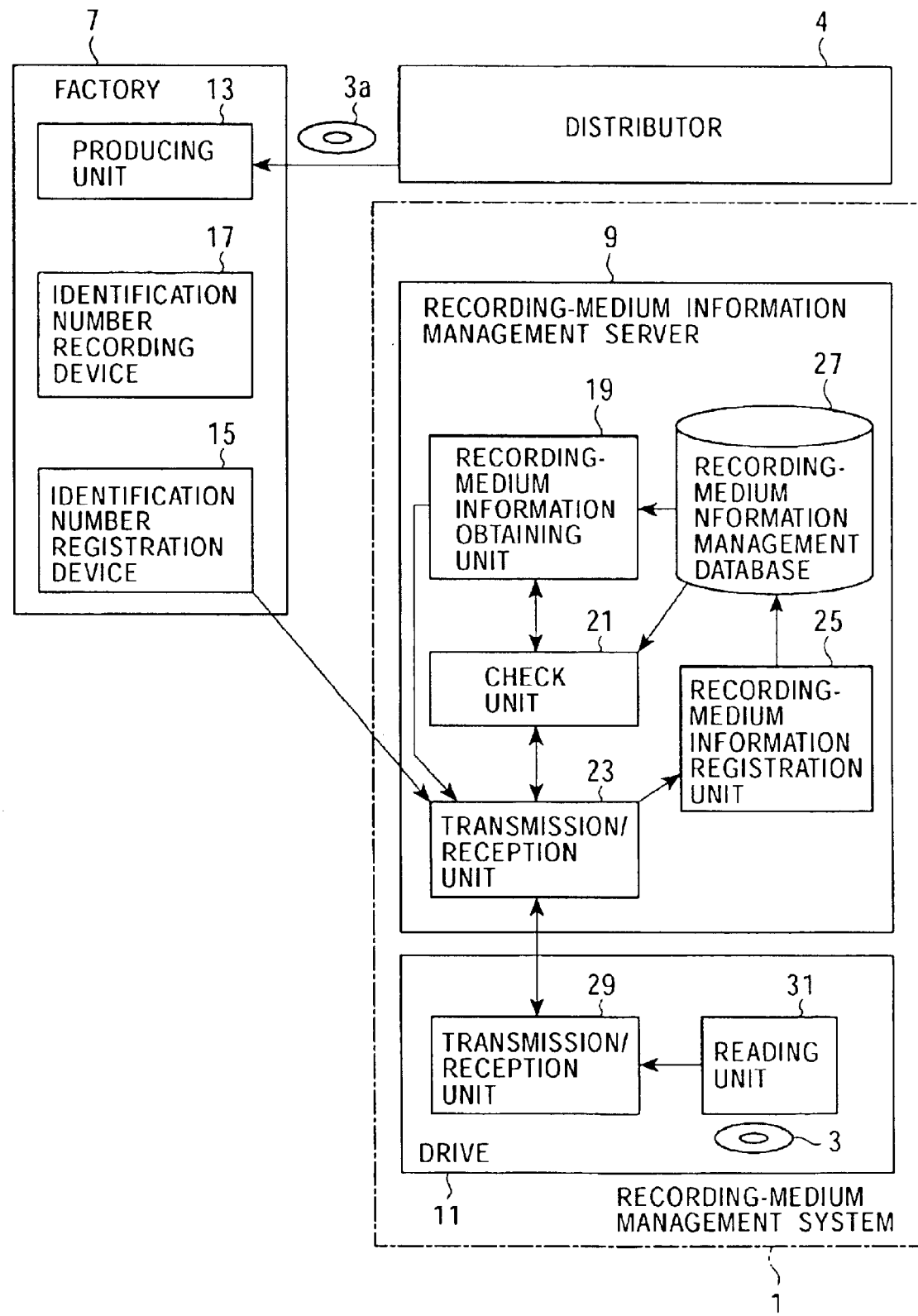
FIG. 1 is a block diagram showing an example of the configuration of a recording-medium management system to which a recording-medium management apparatus according to a first embodiment of the present invention is applied.

FIG. 1 is a block diagram showing an example of the configuration of a recording-medium management system 1 to which a recording-medium management apparatus according to a first embodiment of the present invention is applied.

The recording-medium management system 1 manages a recording medium 3 by performing user registration of the recording medium 3, which has been distributed to and received by a user. Promotion software for performing sales promotion of a product is recorded in the recording medium 3. The promotion software is installed into a drive 11 (playback unit), such as a computer, so that the sales promotion function can be performed.

The recording medium 3 is an information storage medium produced in a factory 7 based on a master disc 3a distributed by a distributor 4. The factory 7 includes a producing unit 13 for receiving the master disc 3a from the distributor 4 and producing the recording medium 3, an identification number recording device 17 for recording a serial number used as an identification number in the produced recording medium 3, and an identification number registration device 15 for registering the identification number of the recording medium 3. The configuration of the identification number recording device 17 will be described later.

Figure 2:
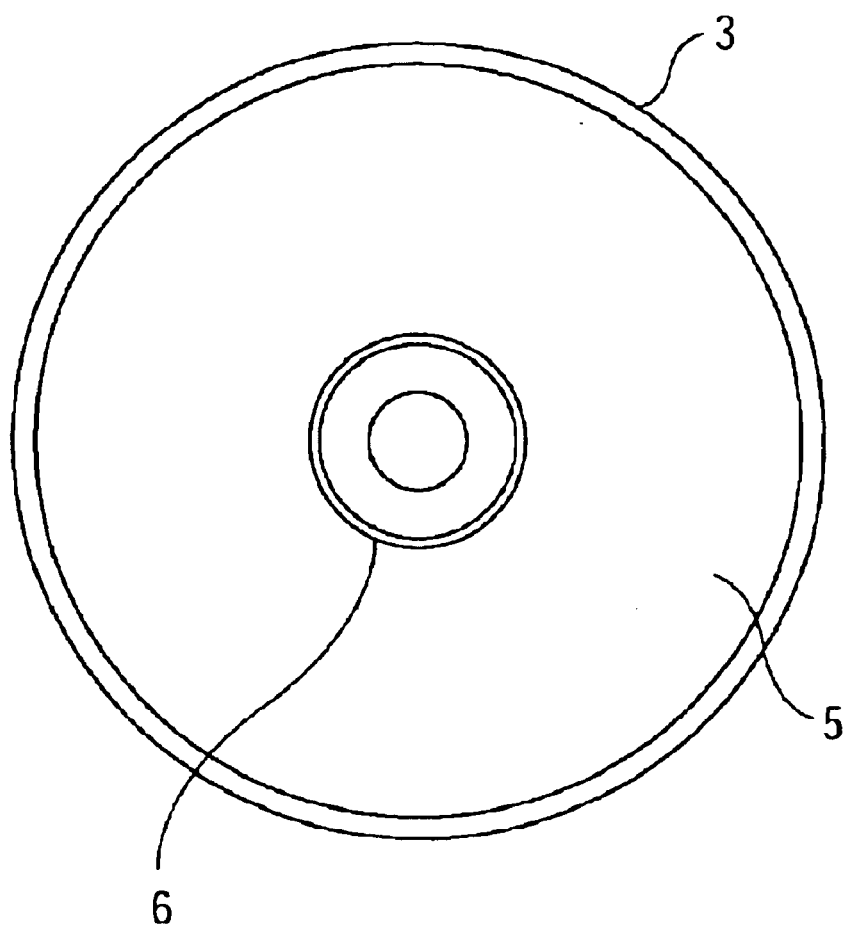
FIG. 2 is an example of the configuration of an optical disc shown in FIG. 1.

The recording medium 3 produced in the factory 7 may be an optical disc, a magnetic disc, a magneto-optical disc, or a semiconductor memory, in which additional data can be recorded. In the following description, an optical disc 3 having a recordable region 6, as shown in FIG. 2, is used. The optical disc 3 is disc-shaped and, in addition to the recordable region 6 in which additional data can be recorded, has at least a data-recording region 5 for recording data such as promotion software for performing a sales promotion function.

As the optical disc 3 having the recordable region 6, a rewritable optical disc, such as a compact disc-recordable (CD-R), a compact disc-rewritable (CD-RW), a mini disc (MD), or a digital versatile disc-recordable (DVD-R), can be used. Also, an optical disc which is normally used only for playback but which has a recordable region can be used. Specific examples of the optical disc 3 are CD (trade name) and DVD (trade name), which are normally used for playback only.

A technique regarding the optical disc 3, which is normally used for playback only but which has a recordable region, is disclosed in Japanese Patent Application Nos. 2001-173781 and 2001-269100.

The drive 11 is a computer or an information terminal into which the optical disc 3 can be loaded and includes a transmission/reception unit 29 (obtaining and transmitting unit) and a reading unit 31 (reading unit), implemented in software. The reading unit 31 is driver software for reading data, such as promotion software, recorded in the recording medium 3. The reading unit 31 automatically operates first when the optical disc 3 is loaded into the drive 11. The reading unit 31 automatically reads at least an identification number given to each optical disc 3 as an identifier so as to identify the optical disc 3. The transmission/reception unit 29 transmits the read identification number to a recording-medium information management server 9, which will be described later. The above-described promotion software is automatically started when it is loaded into, for example, a playback apparatus.

The transmission/reception unit 29 of the drive 11 shown in FIG. 1 is software for transmitting/receiving data to/from the recording-medium information management server 9 through a predetermined network (not shown).

The recording-medium information management server 9 includes a transmission/reception unit 23 (obtaining and transmitting unit), a check unit 21 (check unit), a recording-medium information obtaining unit 19 (obtaining and transmitting unit), a recording-medium information management database 27 (setting information management unit), and a recording-medium information registration unit 25, implemented in software.

The transmission/reception unit 23 transmits/receives data to/from the identification number registration device 15 in the factory 7 and the transmission/reception unit 29 in the drive 11. The recording-medium information management database 27 manages recording-medium information as setting information corresponding to the identification number of the recording medium 3 transmitted from the identification number registration device 15. The recording-medium information may be registered in advance. Alternatively, purchaser information may be registered when a purchaser purchases the recording medium 3. The recording-medium information registration unit 25 registers the identification number of each recording medium 3 and recording-medium information (setting information) corresponding to the identification number in the recording-medium information management database 27.

The recording-medium information can be arbitrarily set in the recording-medium information management database 27 for each identification number. As shown in FIG. 3, the recording-medium information includes an identification number, title, date of manufacture, purchaser, current owner, address, and date and time of update, and preferably, an e-mail news request flag and a catalog request flag. More preferably, the recording-medium information includes a date and time of first access and time from reception to first access. The e-mail news request flag, the catalog request flag, the date and time of first access, and the time from reception to first access can be omitted.

The check unit 21 shown in FIG. 1 checks whether or not the identification number read from the optical disc 3 by the reading unit 31 in the drive 11 is managed in the recording-medium information management database 27. That is, the check unit 21 checks whether or not the optical disc 3 is registered in the recording-medium information management database 27 in advance. Accordingly, the users of the drive 11 who can access the server 9 can be restricted.

The check unit 21 instructs the recording-medium information obtaining unit 19 to obtain recording-medium information corresponding to the identification number. The recording-medium information obtaining unit 19 obtains the corresponding recording-medium information from the recording-medium information management database 27 by using the identification number as a search key.

Figure 4:
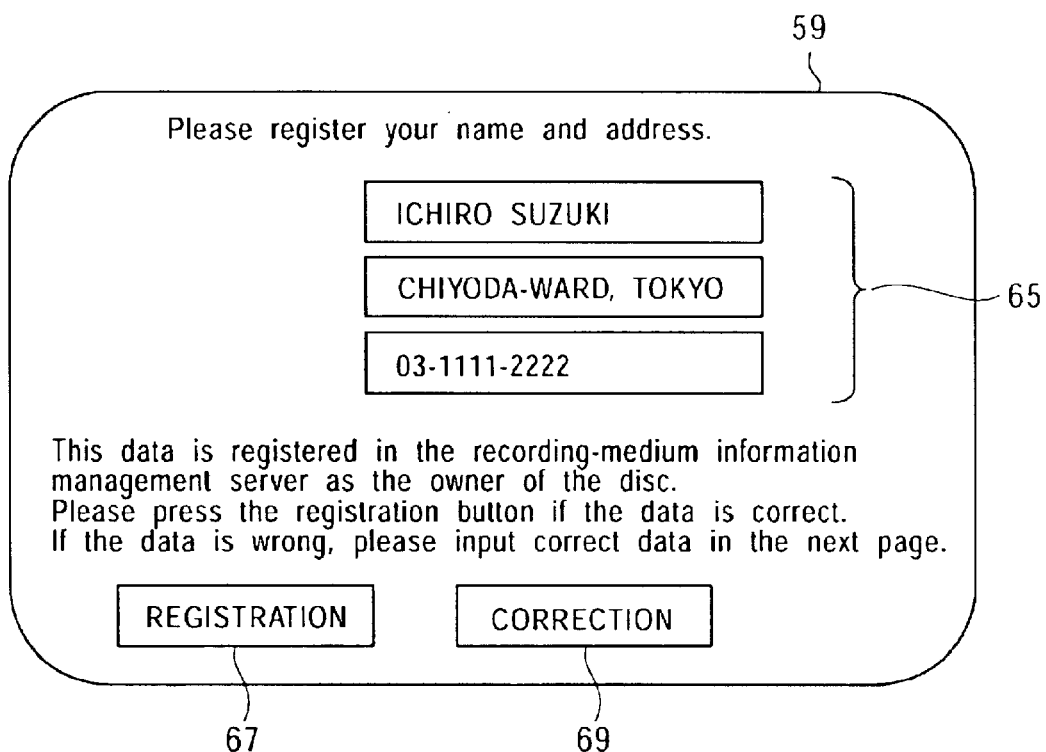
FIG. 4 is an example of a page displayed on a display unit of a drive.

The recording-medium information obtained by the recording-medium information obtaining unit 19 is transmitted to the transmission/reception unit 29 in the drive 11 through the transmission/reception unit 23. As shown in FIG. 4, a predetermined page is displayed on a display unit 59 of the drive 11, and the obtained recording-medium information or part thereof is displayed on the display unit 59. A registration button 67 should be pressed when the displayed recording-medium information 65 is correct. A correction button 69 should be pressed to change to a correcting mode for correcting the recording-medium information 65.

Figure 5:
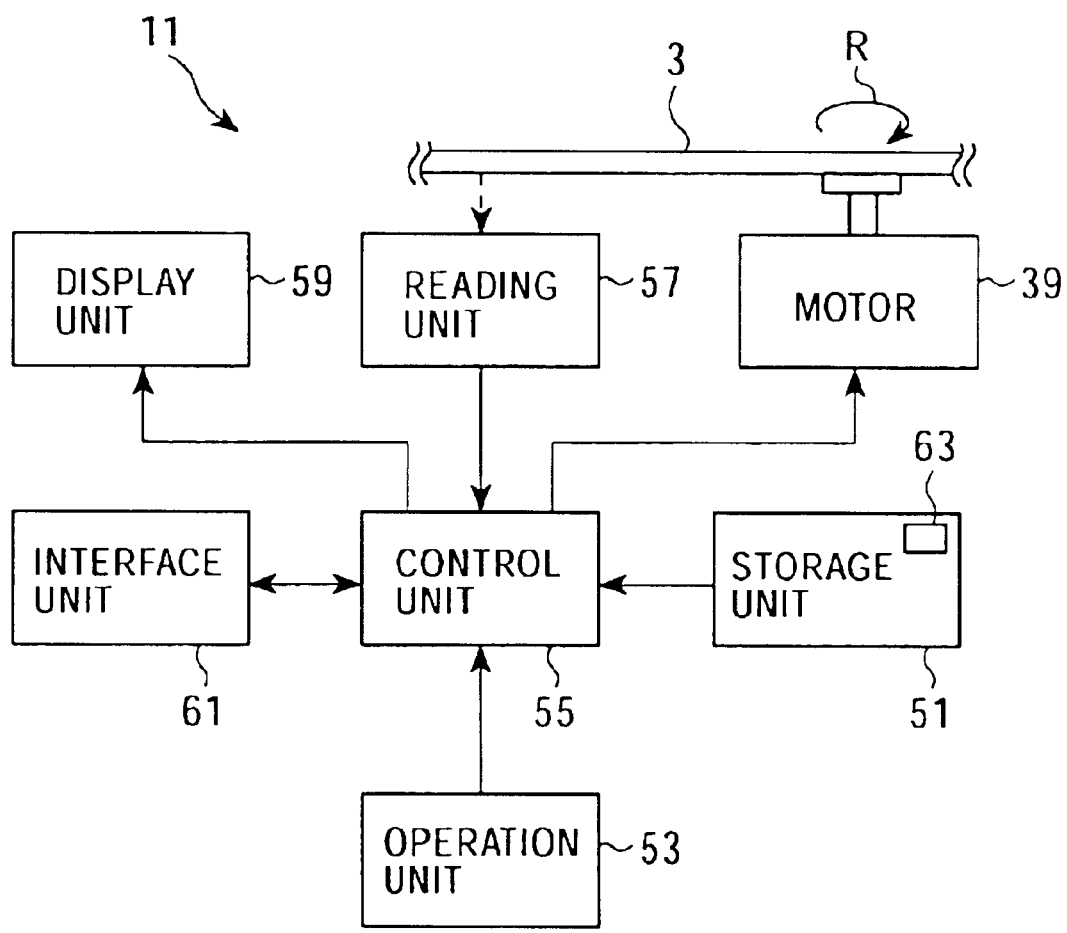
FIG. 5 is a block diagram showing an example of the configuration of the drive shown in FIG. 1.

FIG. 5 is a block diagram showing an example of the configuration of the drive 11 shown in FIG. 1.

The drive 11 includes hardware having a control unit 55, an interface unit 61, an operation unit 53, a storage unit 51, a motor 39, and a reading unit 57, as well as the above-described display unit 59. The control unit 55 is connected to the display unit 59, the interface unit 61, the operation unit 53, the storage unit 51, the motor 39, and the reading unit 57 so as to control these units.

The display unit 59 is, for example, a liquid crystal display or a cathode ray tube (CRT). The interface unit 61 is a network card serving as the hardware which actually transmits the data transmitted by the transmission/reception unit, 29 shown in FIG. 1. The operation unit 53 shown in FIG. 5 includes, for example, a keyboard and a mouse.

The storage unit 51 is an information recording medium such as a memory or a hard disc. The promotion software 63 is read from the optical disc 3 and automatically starts to operate in the memory. The motor 39 rotates the optical disc 3 in the direction indicated by an arrow R in FIG. 5, under the control of the control unit 55. The reading unit 57 automatically reads the promotion software from the data-recording region 5 of the rotating optical disc 3 shown in FIG. 2 and also reads out the identification number from the recordable region 6.

Figure 6:
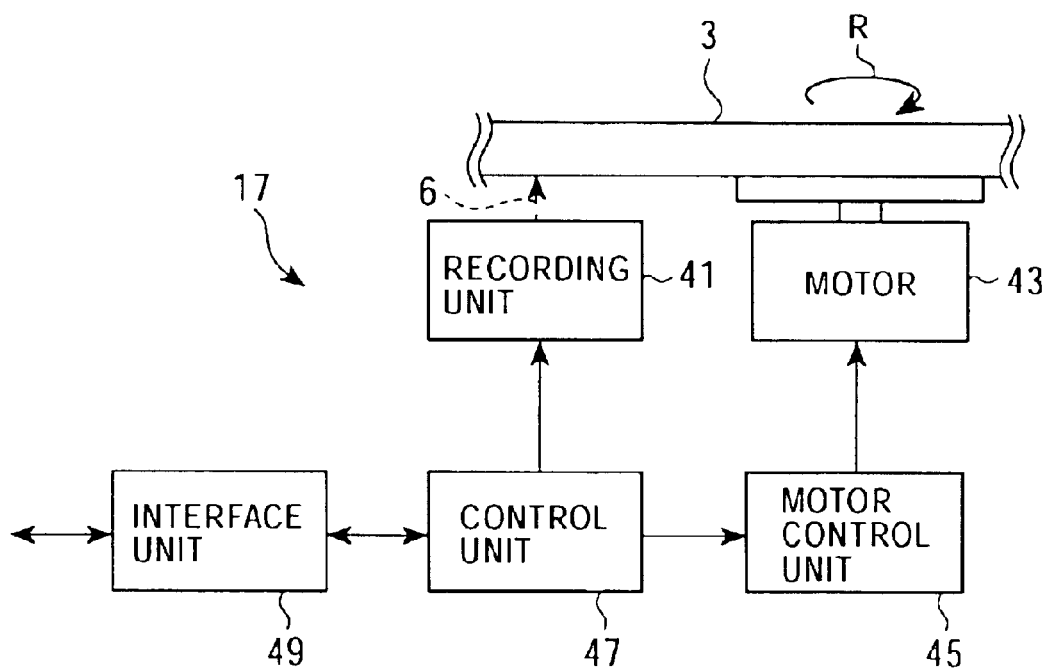
FIG. 6 is a block diagram showing an example of the configuration of an identification number recording device shown in FIG. 1.

FIG. 6 is a block diagram showing an example of the configuration of the identification number recording device 17 shown in FIG. 1.

The identification number recording device 17 operates by linking with the identification number registration device 15 through an interface unit 49 and includes a control unit 47, a recording unit 41, a motor control unit 45, and a motor 43.

The control unit 47 is connected to the interface unit 49, the recording unit 41, and the motor control unit 45 so as to control these units. The motor control unit 45 is a control unit for controlling the driving of the motor 43 for rotating the optical disc 3 in the direction of the arrow R.

The recording unit 41 records an identification number in the recordable region 6 of the rotating optical disc 3 under the control of the control unit 47. The recording unit 41 records the identification number in the recordable region 6 of the optical disc 3 by using a high-power laser, such as a YAG laser. The identification number is data unique to each optical disc 3 and is obtained through the interface unit 49. Also, the control unit 47 controls the motor control unit 45 so that the optical disc 3 rotates, and also controls the recording unit 41 so that the identification number is recorded in the recordable region 6 of the optical disc 3.

The recording-medium management system 1 has the above-described configuration. Hereinafter, the operation of the system 1 (an example of a recording-medium management method) will be described with reference to FIGS. 1 to 6.

Figure 7:
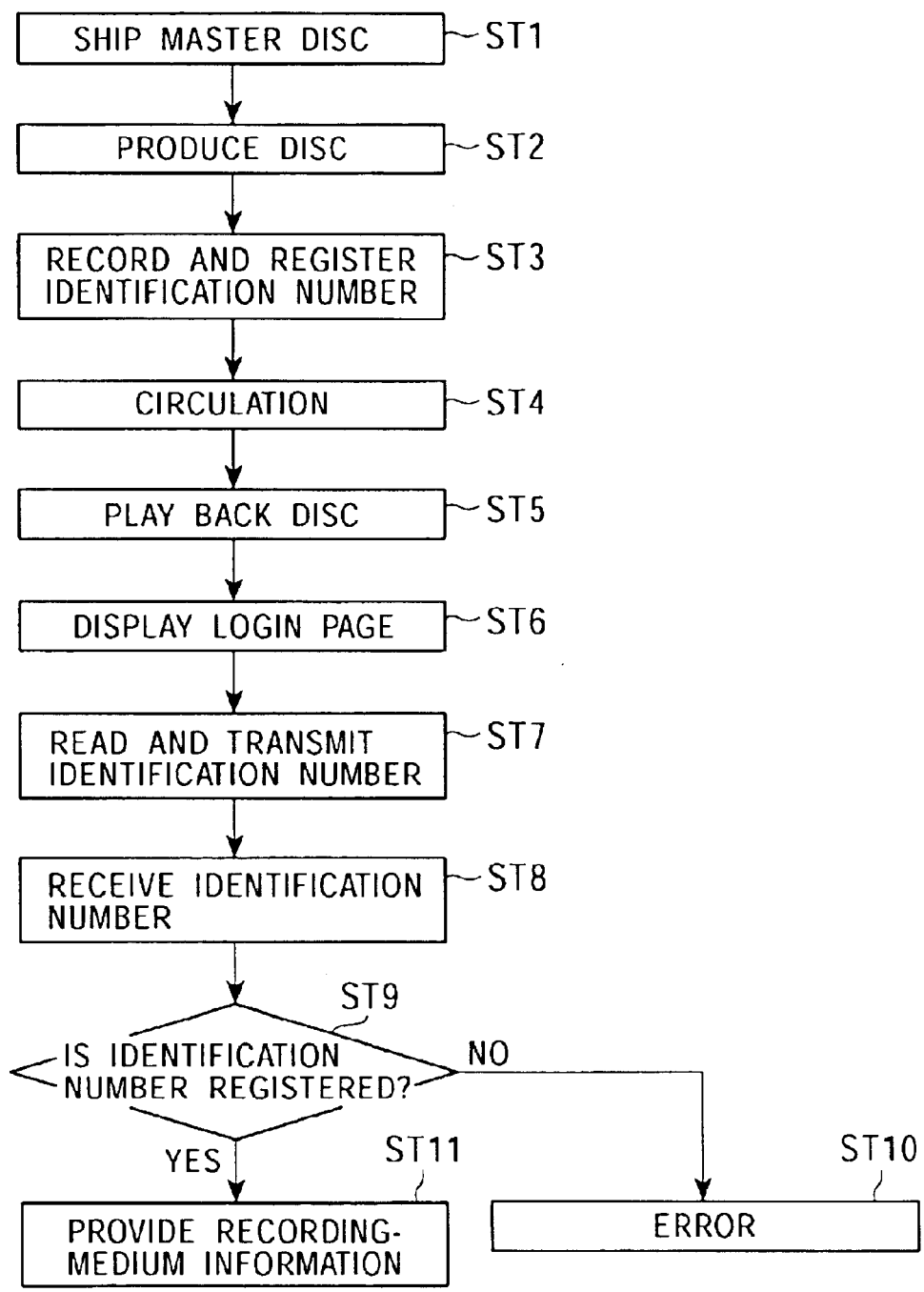
FIG. 7 is a flowchart showing an example of a recording-medium management method performed by the recording-medium management system.

FIG. 7 is a flowchart showing an example of the recording-medium management method performed by the recording-medium management system 1.

The distributor 4 wants to carry out a sales promotion for a predetermined client or for its own product to users having the drive 11. The distributor 4 announces through the Internet, by which effective advertisement can be performed, that it provides the optical disc 3 in which promotion software for performing sales promotion for the product is recorded.

The user of the drive 11 sees the advertisement and requests the distributor 4 to send the optical disc 3. The factory 7 produces the optical disc 3 by the following process based on the master disc 3a distributed by the distributor 4.

In step ST1, the distributor 4 ships the master disc 3a to the factory 7, as shown in FIG. 1. Then, in step ST2, the producing unit 13 produces the optical disc 3 from the master disc 3a. In this state, the above-described promotion software is recorded in the data-recording region 5 of the optical disc 3 shown in FIG. 2, and nothing is recorded in the recordable region 6.

In step ST3, an identification number is recorded in the recordable region 6 of the optical disc 3 by the identification number recording device 17 while the optical disc 3 is being produced. Specifically, the identification number recording device 17 shown in FIG. 6 obtains an identification number generated by an identification number generating unit (not shown) through the interface unit 49 under the control of the control unit 47. Then, the identification number recording device 17 records the identification number in the recordable region 6 of the optical disc 3, which is rotated by the driving of the motor 43 controlled by the motor control unit 45, by using the recording unit 41 under the control of the control unit 47.

Further, in step ST3, the identification number registration device 15 registers the identification number recorded in the optical disc 3 in the recording-medium information management server 9. Specifically, the identification number transmitted from the identification number registration device 15 is received by the transmission/reception unit 23 of the recording-medium information management server 9 and is registered in the recording-medium information management database 27 by the recording-medium information registration unit 25. The identification number may be registered in the recording-medium information management database 27 when the optical disc 3 is sold or on other occasions.

Next, in step ST4, the optical disc 3 which has been registered is circulated on the market. The optical disc 3 is packaged in a jewel case, is further packaged in an envelope or a box, a label on which an address is printed by a label printer (not shown) is attached to the jewel case, and the optical disc 3 is delivered to the user of the drive 11, as described above.

The user receives the optical disc 3 and loads the optical disc 3 into the drive 11 shown in FIG. 5 so as to play back the optical disc 3 in step ST5. When the optical disc 3 is loaded, the promotion software and the reading unit 31 shown in FIG. 1 are automatically started.

In step ST7, the identification number of the optical disc 3 is read by the reading unit 31 (reading step). Also, in step ST7, the identification number is transmitted to the recording-medium information management server 9 by the transmission/reception unit 29 (transmission step). Then, in step ST8, the transmission/reception unit 23 of the recording-medium information management server 9 receives the identification number, and in step ST9, the check unit 21 checks whether or not the identification number is registered in the recording-medium information management database 27 (check step).

If the identification number is not registered, an error occurs (step ST10) and the drive 11 is notified of this fact through the transmission/reception unit 23. The drive 11 displays predetermined error information based on the notification. If the identification number is registered, the process proceeds to step ST11, where the recording-medium information obtaining unit 19 obtains at least the current owner and address (phone number) among the recording-media information shown in FIG. 3 stored in the recording-medium information management database 27 based on the identification number, and transmits the obtained recording-medium information to the drive 11 through the transmission/reception unit 23 (obtaining and transmitting step).

Accordingly, the page shown in FIG. 4 is displayed on the display unit 59 of the drive 11, based on the provided recording-medium information. In this page, the obtained recording-medium information 65 is displayed in fields, into which the user normally has to input the information. Therefore, the user of the drive 11 need not input information into the fields and the user is saved from having to input the information. When the displayed information is correct, the user presses the registration button 67. Accordingly, the recording-medium information, such as the current owner and the address (phone number), is transmitted to the recording-medium information registration unit 25 through the transmission/reception units 29 and 23 so that the information is registered in the recording-medium information management database 27.

In the above description, the recording-medium information preferably includes an e-mail news request flag and a catalog request flag, as shown in FIG. 3. By providing such flags, when the page shown in FIG. 4 is displayed on the display unit 59 of the drive 11 and when the user checks a box for requesting an e-mail news or a catalog, the drive 11 can receive the e-mail news or the catalog.

In this embodiment, when user information as setting information should not be directly circulated on a network such as the Internet, the user information may be registered in the recording-medium information management database 27 in advance and also the user information may be stored in the optical disc 3 together with the identification number.

According to the first embodiment of the present invention, when the data in the recording medium 3 is played back, the recording medium 3 can be easily managed based on the read identification number (identifier). For example, the user of the drive 11 need not input setting items when the optical disc 3 is played back by the drive 11, and the user can be saved from having to input the items. Accordingly, when the above-described recording-medium management system 1 is applied to user registration of software, many users perform user registration, and thus various pieces of information can be provided from the vender side of the software (for example, the recording-medium information management server 9) to the registered users. Also, since many users can register with the recording-medium information management server 9 without inputting setting items, the number of users who do not perform user registration decreases, and thus recording-medium information about new users can be comprehensively managed.

Second Embodiment

Figure 8:
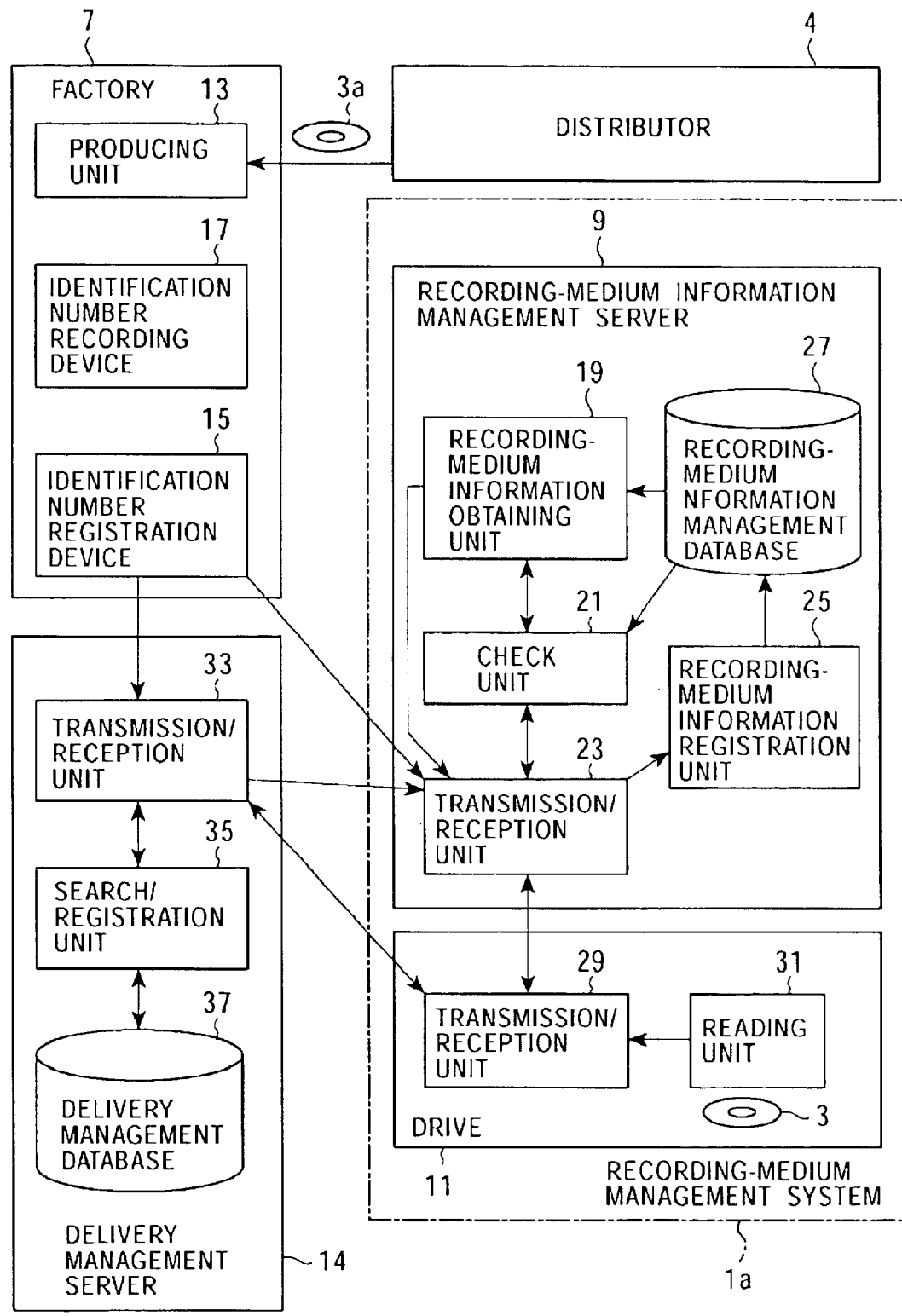
FIG. 8 shows an example of the configuration of a recording-medium management system according to a second embodiment.

FIG. 8 shows an example of the configuration of a recording-medium management system 1a according to a second embodiment.

The configuration of the recording-medium management system 1a of the second embodiment is almost the same as that of the recording-medium management system 1 of the first embodiment, which has been described with reference to FIGS. 1 to 7. Therefore, the elements which are the same as in FIGS. 1 to 7 are denoted by the same reference numerals and the corresponding description is omitted. Hereinafter, different points will be described.

The recording-medium management system 1a includes a delivery management server 14 (delivery management unit) for performing a delivery management step, in addition to the configuration in the first embodiment. The delivery management server 14 manages at least the date and time when the optical disc 3 is delivered and received by a recipient. The delivery management server 14 is a system for embodying circulation procedures in step ST4 of FIG. 7. By applying the delivery management server 14, the recording-medium information about the recording medium 3 is registered in the recording-medium information management database 27 of the recording-medium information management server 9 based on the identification number when the recording medium 3 is delivered. Accordingly, the recording-medium information can be reliably registered in the recording-medium information management database 27 when the recording medium 3 is shipped.

The delivery management server 14 includes a transmission/reception unit 33, a search/registration unit 35, and a delivery management database 37.

The transmission/reception unit 33 receives the identification number from the transmission/reception unit 29 of the drive 11, transmits information about a delivery of the optical disc 3 thereto, and receives the identification number from the identification number registration device 15 of the factory 7. That is, unlike in the first embodiment, the identification number registration device 15 transmits the identification number to the delivery management server 14 as well as to the recording-medium information management server 9. Further, the transmission/reception unit 33 of the delivery management server 14 exchanges the identification number and the recording-medium information with the transmission/reception unit 23 of the recording-medium information management server 9.

The search/registration unit 35 searches and registers information about the delivery of the optical disc 3 by using the identification number recorded in the optical disc 3 as a key. The delivery management server 14 picks out information about the delivery (hereinafter referred to as delivery information) of the optical disc 3 from the delivery management database 37 based on the identification number of the optical disc 3, which has been transmitted from the drive 11, and provides the delivery information to the drive 11.

FIG. 9 is an example of delivery information of the optical disc 3, which is registered in the delivery management database 37 shown in FIG. 8.

The following information can be registered in the delivery management database 37 based on the identification number: a delivery number, destination, date and time of shipment, recipient, address of the recipient, date and time of reception, and date and time of update.

The delivery number is attached to the optical disc 3 by a delivery company that actually delivers the optical disc 3 in order to identify the optical disc 3. The destination is a destination address to which the optical disc 3 is delivered. The date and time of shipment is the date and time when the optical disc 3 is shipped to the recipient. The recipient is the name of a person who actually receives the optical disc 3 and the address of the recipient is the address of the recipient. The date and time of reception is the date and time when the recipient receives the optical disc 3. The date and time of update is the date and time when the delivery information of the optical disc 3 having the corresponding identification number is updated.

Herein, if the recording-medium information management database 27 of the recording-medium information management server 9 includes the date and time of the first access and the time from reception to the first access, the recording-medium information management server 9 can obtain the date and time of reception from the delivery management server 14 so that the time from reception to the first access can be obtained based on the difference between the date and time of reception and the date and time of first access. The time from reception to the first access is an indicator for indicating how much the user of the drive 11 is interested in a product which is introduced by the promotion software recorded in the optical disc 3. Therefore, with such an item of information, the recording-medium information management server 9 can perform marketing of a product which is introduced by the promotion software recorded in the optical disc 3.

In the second embodiment, almost the same advantages as in the first embodiment can be obtained. Additionally, when sales promotion for a product is performed by using the promotion software recorded in the optical disc 3, marketing can be performed in order to investigate how much the user is interested in the introduced product.

The present invention is not limited to the above-described embodiments.

In the embodiments, the identification number of the recording medium 3 is automatically read. Alternatively, as shown in FIG. 10, the identification number may be input by the user if the reading unit 31 cannot read the identification number.

Figure 10:
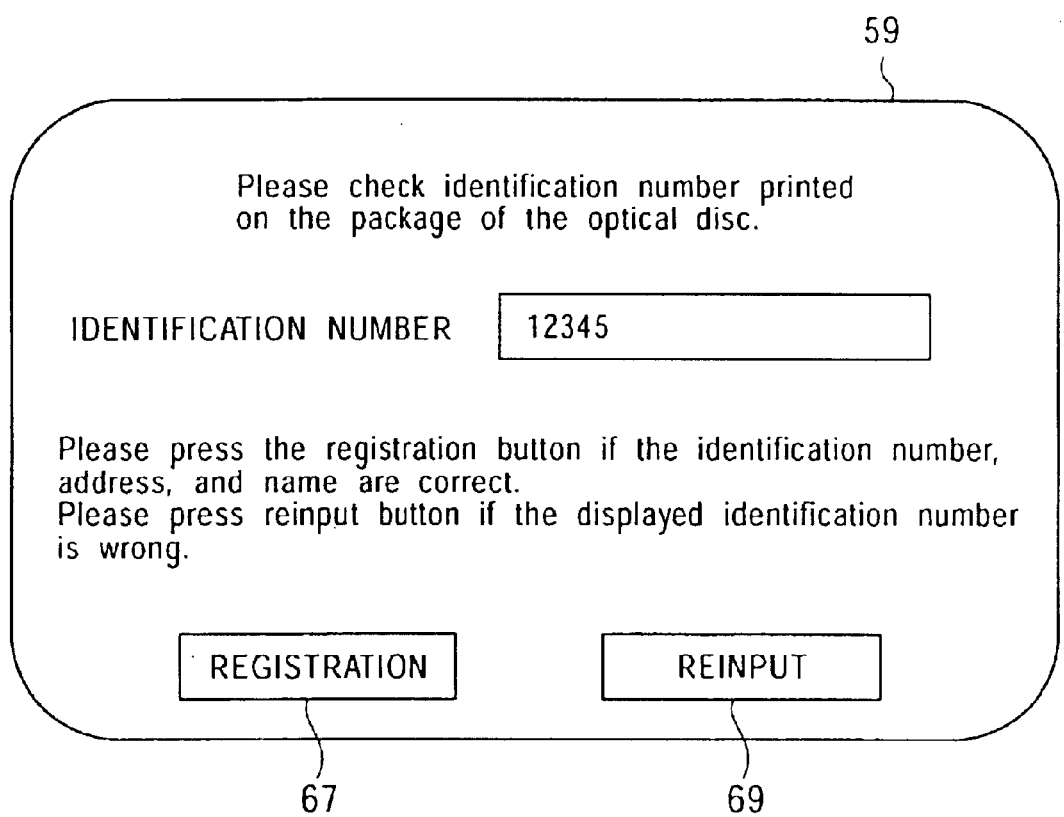
FIG. 10 is an example of a page displayed on the display unit of the drive.

Specifically, the identification number is displayed on the display unit 59 of the drive 11, as shown in FIG. 10. The registration button 67 should be pressed when the identification number is correct, and a reinput button 69 should be pressed after the user has corrected the displayed identification number. For example, the operator of the drive 11 inputs the identification number printed on the jewel case containing the recording medium 3 when the identification number recorded in the recording medium 3 cannot be read. Accordingly, the identification number can be transmitted to the recording-medium information management server 9.

In this way, the drive 11 can reliably transmit the identification number to the recording-medium information management server 9. Furthermore, if the owner of an illegally-copied recording medium inputs a nonexistent, wrong identification number, the drive 11 receives a warning from the recording-medium information management server 9 so that the owner recognizes that he or she cannot use the recording medium. Thus, in a legitimate recording medium 3, the copyright of data of works can be protected.

In order to install the recording-medium management program for executing the above-described processes into a computer so that the program can be executed by the computer, the following program storage media may be used: package media, for example, a flexible disc such as a floppy disc (trade name), a compact disc read only memory (CD-ROM), and a digital versatile disc (DVD). Alternatively, a semiconductor memory and a magnetic disc, to which the recording-medium management program is temporarily or permanently stored, may be used.

The recording-medium management program may be stored in the above-mentioned storage media by using a wired or wireless communication medium such as a local area network, the Internet, or a digital satellite broadcasting, through various communication interfaces such as a router and a modem.

Also, the above-described recording-medium information management server 9 may include a drive which can read at least data of the recording-medium management program recorded in the program storage medium.

The recording-medium management program for realizing the above-described function may be stored in the above-mentioned program storage medium, or may be transmitted through various communication methods including the Internet.

Also, the recording-medium management system 1 may include the identification number recording device 17 and the identification number registration device 15, which are provided in the factory 7 in the above-described embodiments.

The recordable region 6 may be a region defined by, for example, a burst cutting area (BCA).

Further, the identification number recorded in the recordable area 6 may be encrypted. By using this method, if a malicious person tries to read the identification number from the optical disc 3, he or she cannot recognize the identification number itself.

In the above-described embodiments, promotion software for performing promotion of a product is recorded in a recording medium. However, other various programs, data, and data regarding copyright may be recorded in the recording medium. In this way, various information, linked based on the identification number, which is also recorded in the recording medium 3, may be provided to the side of the optical disc 3.

Also, the above-described embodiments can be applied to request login of the user when the optical disc 3 which contains correspondence education software is distributed and the software is conducted. Further, when promotion software of a mail-order catalog of products is distributed and when a consumer starts the promotion software so as to buy a product, the above-described embodiments can be applied to omit input of an account number. In this case, recording-medium information including the account number is registered in the recording-medium information management database 27 of the recording-medium information management server 9.

Further, when the above-described recording-medium management system 1 is realized by using a network such as the Internet, it should be restricted so that the information as shown in FIG. 4, for example, the name and address of the user of the drive 11, is directly transmitted through the Internet, in view of security. Thus, only the identification number may be transmitted through the Internet so that the user visually checks the identification number, as shown in FIG. 10.

In the configuration of the above-described embodiments, a part may be omitted or a different combination may be realized.

As described above, the present invention can provide a recording-medium management apparatus, a recording-medium management method, a program having a function of managing a recording medium, and a computer-readable program storage medium for storing the program, in which a recording medium may be easily managed based on an identifier which is read when the data in the recording medium is played back.

What is claimed is:

1. A recording-medium management apparatus comprising:
   playback means for playing back data recorded in a removable recording medium to which a unique identifier is attached; and
   recording-medium management means for managing the recording medium based on the identifier,
   wherein the playback means includes:
      reading means for automatically reading the identifier from the recording medium when the data is played back; and
      transmission means for transmitting the read identifier to the recording-medium management means, and
   wherein the recording-medium management means includes:
      setting information management means for managing setting information corresponding to the identifier;
      check means for checking whether or not the setting information corresponding to the identifier received from the playback means is managed by the setting information management means; and
      obtaining-and-transmitting means for obtaining the setting information corresponding to the identifier from the setting information management means and transmitting the setting information to the playback means.

2. The apparatus according to claim 1, wherein the setting information is registered in the setting information management means based on the identifier when the recording medium is delivered.

3. The apparatus according to claim 1, wherein, when the reading means cannot read the identifier of the recording medium, the identifier can be input to the playback means.

4. The apparatus according to claim 1, further comprising:
   delivery management means for managing at least the date and time of reception, which is the date and time when the delivered recording medium is received by a recipient,
   wherein the setting information includes the date and time of first access, which is the date and time when the playback means accesses the recording-medium management means for the first time, and elapsed time from the date and time of reception to the date and time of first access.

5. The apparatus according to claim 1,
   wherein, in the playback means, a predetermined item which is a part of the setting information is requested to be input and the input item is transmitted to the recording-medium management means together with the identifier when the data recorded in the recording medium is played back, and the recording-medium management means determines whether or not the input item matches the predetermined item.

6. A recording-medium management method performed by playback means for playing back data recorded in a removable recording medium to which a unique identifier is attached and recording-medium management means for managing the recording medium based on the identifier, the method comprising:
   in the playback means,
   a reading step for automatically reading the identifier from the recording medium when the data is played back; and
   a transmission step for transmitting the read identifier to the recording-medium management means, and
   in the recording-medium management means,
   a setting information management step for managing setting information corresponding to the identifier;
   a check step for checking whether or not the setting information corresponding to the identifier received from the playback means is managed; and
   an obtaining-and-transmitting step for obtaining the setting information corresponding to the identifier from setting information management means and transmitting the setting information to the playback means.

7. The method according to claim 6, wherein the setting information is registered in the setting information management means based on the identifier when the recording medium is delivered.

8. The method according to claim 6, wherein, when the identifier of the recording medium cannot be read in the reading step, the identifier can be input to the playback means.

9. The method according to claim 6, further comprising:
   a delivery management step for managing at least the date and time of reception, which is the date and time when the delivered recording medium is received by a recipient,
   wherein the setting information includes the date and time of first access, which is the date and time when the playback means accesses the recording-medium management means for the first time, and elapsed time from the date and time of reception to the date and time of first access.

10. The method according to claim 6,
    wherein, in the playback means, a predetermined item which is a part of the setting information is requested to be input and the input item is transmitted to the recording-medium management means together with the identifier when the data recorded in the recording medium is played back, and the recording-medium management means determines whether or not the input item matches the predetermined item.

11. A recording-medium management program for performing a recording-medium management function by playback means for playing back data recorded in a removable recording medium to which a unique identifier is attached and recording-medium management means for managing the recording medium based on the identifier, wherein the playback means includes:
  reading means for automatically reading the identifier from the recording medium when the data is played back; and
  transmission means for transmitting the read identifier to the recording-medium management-means, and
wherein the recording-medium management means includes:
  setting information management means for managing setting information corresponding to the identifier;
  check means for checking whether or not the setting information corresponding to the identifier received from the playback means is managed by the setting information management means; and
  obtaining-and-transmitting means for obtaining the setting information corresponding to the identifier from the setting information management means and transmitting the setting information to the playback means.

12. A computer-readable program storage medium for storing a recording-medium management program for performing a recording-medium management function by playback means for playing back data recorded in a removable recording medium to which a unique identifier is attached and recording-medium management means for managing the recording medium based on the identifier,
wherein the playback means includes:
  reading means for automatically reading the identifier from the recording medium when the data is played back; and
  transmission means for transmitting the read identifier to the recording-medium management means, and
wherein the recording-medium management means includes:
  setting information management means for managing setting information corresponding to the identifier;
  check means for checking whether or not the setting information corresponding to the identifier received from the playback means is managed by the setting information management means; and
  obtaining and-transmitting means for obtaining the setting information corresponding to the identifier from the setting information management means and transmitting the setting information to the playback means.

* * * * *